US00RE50011E

(19) United States
(12) Reissued Patent
Li et al.

(10) Patent Number: US RE50,011 E
(45) Date of Reissued Patent: Jun. 11, 2024

(54) METHODS AND DEVICES FOR BROADCASTING SYSTEM INFORMATION ON DEMAND

(71) Applicant: Telefonaktiebolaget LM Ericsson (publ), Stockholm (SE)

(72) Inventors: Gen Li, Beijing (CN); Hai Wang, Beijing (CN); Jianfeng Wang, Beijing (CN)

(73) Assignee: Telefonaktiebolaget LM Ericsson (publ), Stockholm (SE)

(21) Appl. No.: 17/388,539

(22) Filed: Jul. 29, 2021

Related U.S. Patent Documents

Reissue of:
(64) Patent No.: 10,368,335
Issued: Jul. 30, 2019
Appl. No.: 15/113,888
PCT Filed: Oct. 29, 2015
PCT No.: PCT/CN2015/093191
§ 371 (c)(1),
(2) Date: Jul. 25, 2016
PCT Pub. No.: WO2017/070888
PCT Pub. Date: May 4, 2017

(51) Int. Cl.
*H04W 72/04* (2023.01)
*H04W 48/10* (2009.01)
(Continued)

(52) U.S. Cl.
CPC ..... *H04W 72/30* (2023.01); *H04W 48/10* (2013.01); *H04W 48/14* (2013.01);
(Continued)

(58) Field of Classification Search
CPC ..... H04W 72/0453; H04W 72/005; H04W 48/10; H04W 48/14; H04W 72/0446;
(Continued)

(56) References Cited

U.S. PATENT DOCUMENTS 8,538,444 B2 9/2013 Lee et al.
2010/0027466 A1 2/2010 Mustapha ..... H04J 11/0069 370/328
(Continued)

FOREIGN PATENT DOCUMENTS

CN 101523957 A 9/2009
CN 101601208 A 12/2009
(Continued)

OTHER PUBLICATIONS

Examination Report No. 1 For Standard Patent Application issued by Australian Government, IP Australia for Application No. 2021202649—dated Feb. 14, 2022.
(Continued)

*Primary Examiner* — Ovidio Escalante
(74) *Attorney, Agent, or Firm* — Baker Botts L.L.P.

(57) ABSTRACT

Embodiments of the present disclosure relate to methods and devices for broadcasting system information on demand. In example embodiments, the system information is classified as essential and optional system information. The essential information is broadcasted periodically, and the optional system information is broadcasted in response to the request by UEs. In this way, the system information can be in an effective and efficient way, thereby saving significant resource and energy can be saved especially in the case of no load or low load.

32 Claims, 5 Drawing Sheets

(51) Int. Cl.

| | |
|---|---|
| ***H04W 48/14*** | (2009.01) |
| ***H04W 72/00*** | (2023.01) |
| ***H04W 72/044*** | (2023.01) |
| ***H04W 72/0446*** | (2023.01) |
| ***H04W 72/0453*** | (2023.01) |
| ***H04W 72/30*** | (2023.01) |
| ***H04W 72/51*** | (2023.01) |

(52) U.S. Cl.
CPC ... *H04W 72/0446* (2013.01); *H04W 72/0453* (2013.01); *H04W 72/046* (2013.01); *H04W 72/51* (2023.01); *Y02D 30/70* (2020.08)

(58) Field of Classification Search
CPC ... H04W 72/046; H04W 72/048; Y02D 30/70
See application file for complete search history.

(56) References Cited

U.S. PATENT DOCUMENTS

| | | | | |
|---|---|---|---|---|
| 2010/0103854 | A1 | 4/2010 | Lee et al. | |
| 2010/0271999 | A1 | 10/2010 | Yu et al. | |
| 2012/0163305 | A1 | 6/2012 | Nimbalker et al. | H04W 52/0206 370/329 |
| 2012/0320842 | A1 | 12/2012 | Jeong et al. | |
| 2013/0028117 | A1* | 1/2013 | Montojo | H04L 5/001 370/252 |
| 2013/0115951 | A1* | 5/2013 | Deng | H04W 36/24 455/436 |
| 2014/0105224 | A1 | 4/2014 | Frederiksen et al. | |
| 2014/0126434 | A1* | 5/2014 | Li | H04L 5/14 370/280 |
| 2014/0162668 | A1 | 6/2014 | Na et al. | |
| 2014/0321336 | A1 | 10/2014 | Hong et al. | |
| 2014/0348094 | A1* | 11/2014 | Charbit | H04W 56/00 370/329 |
| 2015/0011213 | A1 | 1/2015 | Lou et al. | |
| 2015/0071223 | A1 | 3/2015 | Lee et al. | |
| 2015/0256995 | A1 | 9/2015 | Rune et al. | |
| 2015/0282042 | A1* | 10/2015 | Griot | H04W 40/04 370/329 |
| 2016/0135158 | A1* | 5/2016 | Krishnamoorthy | H04W 56/001 370/329 |
| 2016/0234736 | A1* | 8/2016 | Kubota | H04W 36/0083 |
| 2016/0234759 | A1* | 8/2016 | Kubota | H04W 48/14 |
| 2016/0295503 | A1* | 10/2016 | Bucknell | H04W 74/006 |
| 2017/0086131 | A1* | 3/2017 | Gupta | H04W 48/14 |
| 2017/0265165 | A1 | 9/2017 | Li et al. | |

FOREIGN PATENT DOCUMENTS

| | | | |
|---|---|---|---|
| CN | 101730248 | | 6/2010 |
| CN | 101730248 | A | 6/2010 |
| CN | 103283283 | A | 9/2013 |
| EP | 2323426 | A1 | 5/2011 |
| EP | 3202201 | A1 | 8/2017 |
| EP | 3202201 | B1 | 2/2020 |
| JP | H09298766 | | 11/1997 |
| JP | 2005117357 | | 4/2005 |
| JP | 2006197264 | | 7/2006 |
| JP | 2009260749 | | 11/2009 |
| JP | 2010506434 | | 2/2010 |
| JP | 2010506434 | A | 2/2010 |
| JP | 2010258974 | | 11/2010 |
| JP | 201239400 | A | 2/2012 |
| JP | 201355461 | | 3/2013 |
| JP | 2013143615 | A | 7/2013 |
| JP | 2014143562 | | 6/2014 |
| JP | 2015502062 | A | 1/2015 |
| KR | 20090095555 | | 9/2009 |
| KR | 20150097754 | | 8/2015 |
| RU | 2495547 | | 8/2008 |
| RU | 2558733 | | 11/2010 |
| WO | 0158193 | | 8/2001 |
| WO | 2008044664 | A | 4/2008 |
| WO | 2012092066 | A1 | 7/2012 |
| WO | 2014110772 | | 7/2014 |
| WO | 2014110772 | A1 | 7/2014 |
| WO | 2014129951 | A1 | 8/2014 |
| WO | 2015113653 | A1 | 8/2015 |
| WO | 2015154296 | | 10/2015 |
| WO | 2015154296 | A1 | 10/2015 |
| WO | 2017070888 | A1 | 5/2017 |

OTHER PUBLICATIONS

EPO Communication Pursuant to Article 94(3) EPC issued for Application No. 19 217 733.5-1216—dated May 12, 2022.
Office Action in Chinese Application No. 201580083246.2 dated Jun. 2, 2021.
Office Action in Chinese Application No. 201580083246.2 dated Jan. 11, 2022.
Appeal Preliminary Examination Report for corresponding JP Application No. 2018-522014 dated Sep. 21, 2021.
3GPP TSG RAN WG2#56, Nov. 6-10, 2006, Riga, Latvia; Tdoc R2-063137; Agenda Item: 11.3 Delivery of System Information to the UE (broadcast & other mechanism), Source: Nortel, Title: System Information broadcast gating, Document for: Discussion and decision.
RU Office Action received for Patent Application No. 2019110130/07 dated Oct. 22, 2021.
RU Search Report for Patent Application No. 2019110130/07 dated Oct. 20, 2021.
Brazil Patent Office, Notice of Allowance in Application No. BR112018001752-3 dated Sep. 4, 2023 (computer translated).
"5G—Key Component of The Networked Society," RWS-150009, 3GPP RAN Workshop on 5G, Phoneix, AZ, USA, Sep. 17-18, 2015.
Office Action of the Intellectual Property Office of Taiwan for Patent Application No. 105128245—dated Nov. 1, 2017.
5G—Key Component of the Networked Society; RWS-150009; 3GPP RAN Workshop on 5G; Phoenix, Arizona, USA—Sep. 17-18, 2015.
Examination Report No. 2 for Standard Patent Application issued by Australian Government, IP Australia for Application No. 2015413546—dated Sep. 13, 2018.
5G—Key Component of the Networked Society, Ericsson; RWS-150009, 3GPP RAN Workshop on 5G, Phoenix, AZ, USA—Sep. 17-18, 2015.
Examination Report No. 1 For Standard Patent Application issued by IP Australia for Application No. 2015413546—dated Jul. 24, 2018.
Preliminary Search Report on Patentanility With Written Opinion issued by the Moroccan Office of Industrial and Commercial Property for Patent Application No. 42338—dated Apr. 25, 2018.
Canadian Office Action issued for Application No. 3,003,071—dated Mar. 5, 2019.
Notice for Reasons for Rejection issued by the Japanese Patent Office for Japanese Patent Application No. 2018-522014—dated Oct. 29, 2019.
Preliminary Office Action issued by the Brazilian Patent Office for BR112018001752-3—dated Jul. 29, 2020.
JP Notice of Reasons for Rejection for Patent Application No. 2018-522014—dated Mar. 8, 2019.
RU Decision to Grant for Application No. 2018118772—dated Mar. 19, 2019.
KR First Office Action issued for Application No. 09-05-2019-027198520—dated Apr. 15, 2019.
Notice of Allowance issued by the Korean Intellectual Property Office for Patent Application No. 10-2018-7011697—dated Oct. 12, 2019.
Office Action issued by the Israel Patent Office for Patent Application No. 257023—dated Oct. 2, 2019.
Office Action issued by the Canadian Intellectual Property Office for Application No. 3,003,071—dated Feb. 25, 2020.

(56) References Cited

OTHER PUBLICATIONS

Communication Pursuant to Article 94(3) EPC issued for Application No. 15 906 862.6-1214—dated Sep. 5, 2019.
Examination Report issued by the Government of India, Intellectual Property India for Application No. 201717015631—dated Feb. 27, 2020.
JP Notice of Reasons for Rejection issued for Patent Application No. 2018-522014; date prepared: May 25, 2020—dated Jun. 2, 2020.
3GPP TSG RAN WG2#56; Riga, Latvia; Agenda Item: 11.3 Delivery of System Information to the UE (broadcast & other mechanism); Source: Nortel; Title: System Information broadcast gating (Tdoc R2-063137)—Nov. 6-10, 2006.
TSG-RAN Working Group2#55; Seoul, Korea; Source: NEC; Title: LTE BCH-on-demand (R2-062930)—Oct. 9-13, 2006.
TSG-RAN Working Group 2#56; Riga, Latvia; Agenda Item: 11.3; Source: NEC; Title: Further clarification of on-demand S-BCH (R2-063090)—Nov. 6-10, 2006.
European Search Report issued for Application No./Patent No. 19217733.5-1212—dated May 11, 2020.
Office Action issued by the Republic of Indonesia, Directorate General of Intellectual Property for Application No. P00201802316—dated Jun. 12, 2020.
PCT International Search Report for International application No. PCT/CN2015/093191—dated Aug. 2, 2016.
PCT Written Opinion of the International Searching Authority for the International application No. PCT/CN2015/093191—dated Aug. 2, 2016.
Supplementary European Search Report for Application No. / Patent No. 15906862.6-1854 / 3202201 PCT/CN2015093191—dated Sep. 18, 2017.
EPO Communication Pursuant to Article 94(3) EPC for Application No. 15 906 862.6-1214—dated Mar. 19, 2019.

* cited by examiner

METHODS AND DEVICES FOR BROADCASTING SYSTEM INFORMATION ON DEMAND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

[This nonprovisional application is] *This patent application is for a broadening reissue of U.S. Pat. No. 10,368,335. U.S. Pat. No. 10,368,335 issued Jul. 30, 2019 from U.S. application Ser. No. 15/113,888 which was filed Jul. 25, 2016 as* a U.S. National Stage Filing under 35 U.S.C. § 371 of International Patent Application Serial No. PCT/CN2015/093191, filed Oct. 29, 2015, and entitled "Methods And Devices For Broadcasting System Information On Demand".

FIELD

Embodiments of the present disclosure generally relate to the field of telecommunication, and in particular, to methods and devices for broadcasting system information on demand.

BACKGROUND

In future telecommunication like the Fifth Generation (5G) systems, there will be massive growth of device number and traffic volume. Energy efficiency is an import aspect especially when there is low traffic load. To this end, system information which is required for terminal devices to access cells of base stations (BSs) should be transmitted in an efficient fashion.

Conventionally in Long Term Evolution (LTE) systems, the system information is delivered by two different mechanisms relying on different transport channels. A part of system information is transmitted as Master-Information Blocks (MIBs) on broadcast channel (BCH). The remaining part of system information is transmitted as System-Information Blocks (SIBs) on downlink shared channel (DL-SCH). The MIB includes quite limited amount of system information which is absolutely required for terminals to be able to read the remaining SIBs provided on the DL-SCH. Both MIBs and SIBs are broadcasted periodically even there is no terminal around the BS, thereby causing wasting of energy and resources.

SUMMARY

In general, example embodiments of the present disclosure provide methods and devices for broadcasting system information on demand.

In a first aspect, a method implemented by a device is provided. According to the method, essential system information and a resource configuration of a demand channel are broadcasted, where the essential system information is required to access a cell of the device. The device monitors, on the demand channel, a request for at least a part of optional system information other than the essential system information. In response to receiving the request, the part of the optional system information is broadcasted. A computer program product for carry out this method is also provided.

In some embodiments, the demand channel is a common channel shared by terminals in the cell.

In some embodiments, broadcasting the essential system information and the resource configuration of the demand channel comprises: broadcasting the resource configuration of the demand channel and at least a part of the essential system information in an access information table (AIT).

In some embodiments, broadcasting the essential system information comprises: broadcasting semi-static system information of the essential system information with a first period; and broadcasting dynamic system information of the essential system information with a second period that is less than the first period, where the dynamic system information includes the resource configuration of the demand channel.

In some embodiments, the method further comprises: broadcasting a configuration of a resource zone with the essential system information. Broadcasting the part of the optional system information comprises: broadcasting the part of the optional system information in the resource zone.

In some embodiments, broadcasting the part of the optional system information comprises: broadcasting an indicator in a predefined resource zone to indicate existence of the part of the optional system information; and broadcasting the part of the optional system information in the predefined resource zone.

In some embodiments, broadcasting essential system information and the resource configuration of the demand channel comprises: broadcasting the resource configuration of the demand channel as a part of the essential system information.

In some embodiments, the resource configuration of the demand channel includes at least one of the following: a period of the demand channel, a time offset with respect to a reference signal, or a frequency offset with respect to the reference signal.

In some embodiments, the method further comprises: determining the resource configuration of the demand channel based on at least one of the following: beamforming of the device, or grouping of terminals in the cell.

In some embodiments, monitoring the request comprises: monitoring a sequence as the request, the sequence being common to a plurality of terminals in the cell.

In a second aspect, a method implemented by a terminal is provided. According to the method, the terminal receives essential system information and a resource configuration of a demand channel that are broadcasted by a device, where the essential system information being required to access a cell of the device. Then the at least a part of optional system information other than the essential system information is received, where received part of the optional system information is broadcasted by the device in response to a request that is sent on the demand channel according to the resource configuration. A computer program product for carry out this method is also provided.

In a third aspect, a device is provided. The device comprises a transceiver configured to broadcast essential system information and a resource configuration of a demand channel, where the essential system information is required to access a cell of the device. The device further comprises a controller configured to monitor, on the demand channel, a request for at least a part of optional system information other than the essential system information. The transceiver is further configured to broadcast the part of the optional system information in response to receiving the request.

In a fourth aspect, a terminal is provided. The terminal comprises a receiver configured to receive essential system information and a resource configuration of a demand channel that are broadcasted by a device, where the essential system information is required to access a cell of the device. The receiver is further configured to receive at least a part of optional system information other than the essential system information, where the part of the optional system information is broadcasted by the device in response to a request that is sent on the demand channel according to the resource configuration.

In a fifth aspect, a device is provided. The device comprises a processor and a memory. The memory contains instructions executable by the processor, and the processor is configured to cause the device to: broadcast essential system information and a resource configuration of a demand channel, where the essential system information is required to access a cell of the device; monitor, on the demand channel, a request for at least a part of optional system information which is other than the essential system information; and broadcast the part of the optional system information in response to receiving the request.

In a sixth aspect, a terminal is provided. The terminal comprises a processor and a memory. The memory contains instructions executable by the processor, and the processor is configured to cause the terminal to: receive essential system information and a resource configuration of a demand channel that are broadcasted by a device, where the essential system information is required to access a cell of the device; and receive the at least a part of optional system information other than the essential system information, where the received part of the optional system information is broadcasted by the device in response to a request that is sent on the demand channel according to the resource configuration.

Through the following description, it would be appreciated that according to embodiments of the present disclosure, the system information is classified as essential and optional system information. The essential information is broadcasted periodically, and the optional system information is broadcasted on demand. In this way, significant resource and energy can be saved especially in the case of no load or low load. Moreover, even when multiple UEs need the system information, the system information can be provided efficiently. Additionally, inconvenience of obtaining system information for idle UEs can be solved.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "terminal device" or "terminal" refers to any device having wireless communication capabilities, including, but not limited to, mobile phones, cellular phones, smart phones, personal digital assistants (PDAs), portable computers, image capture devices such as digital cameras, gaming devices, music storage and playback appliances, any portable units or terminals that have wireless communication capabilities, or Internet appliances enabling wireless Internet access and browsing and the like.

In addition, in the context of the present disclosure, the terms "terminal" and "user equipment (UE)" can be used interchangeably for ease of discussion. Examples of a UE in a telecommunication system include, but are not limited to, a Mobile Terminal (MT), a Subscriber Station (SS), a Portable Subscriber Station (PSS), a Mobile Station (MS), or an Access Terminal (AT).

As used herein, the term "base station" (BS) refers to a device which is capable of providing or hosting a cell to which one or more terminals can access. Examples of a BS include, but are not limited to, a Node B (NodeB or NB), an Evolved NodeB (eNodeB or eNB), a Remote Radio Unit (RRU), a radio header (RH), a remote radio head (RRH), a relay, a low power node such as a femto, a pico, and the like.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
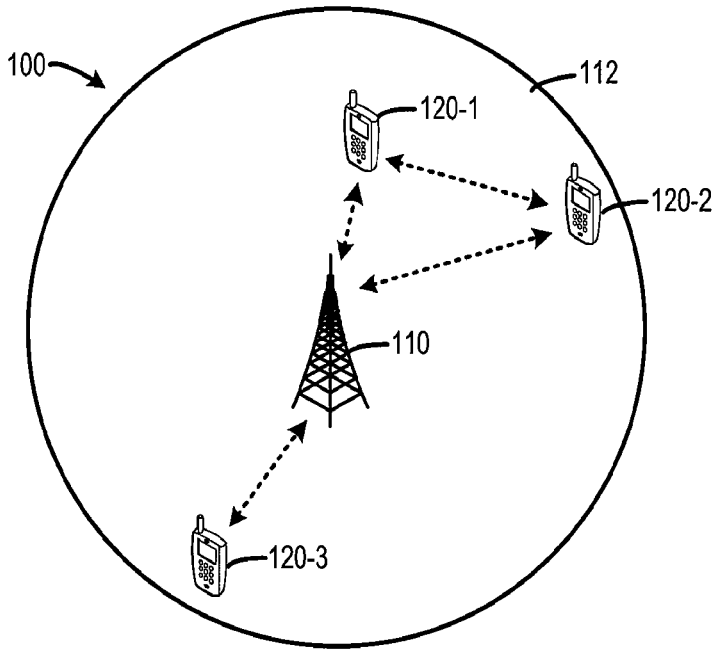
FIG. 1 is a simplified block diagram of an environment in which embodiments of the present disclosure can be implemented.

FIG. 1 shows a block diagram of an environment in which embodiments of the present disclosure can be implemented. The environment 100, which is a part of a communication network, includes a device 110 and one or more terminals 120-1, 120-2, . . . , 120-N (collectively referred to as "terminals" 120). Only for ease of discussion, in the following description, the device 110 will be described as a BS and the terminals 120 will be described as UEs. It is to be understood that BS and UEs are only example implementations of the device 110 and terminals 120, respectively, without suggesting any limitation as to the scope of the present disclosure. Any other suitable implementations are possible as well.

Within the coverage area of a cell 112 of the BS 110, the UEs 120 may communicate with the BS 110 and possibly with each other, as indicated by the dashed lines. The communications may conform to any suitable standards including, but not limited to, LTE-Advanced (LTE-A), LTE, Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but are not limited to, the first generation (1G), the second generation (2G), 2.5G, 2.75G, the third generation (3G), the fourth generation (4G), 4.5G, the future fifth generation (5G) communication protocols.

In order to access the cell 112, the UEs 120 need to obtain system information associated with the BS 110. Conventionally, as mentioned above, all the system information is broadcasted periodically. For example, in LTE systems, MIB is broadcasted to allow UEs to obtain SIBs. Different SIBs may be defined based on the type of information included therein. Similar to MIB, SIBs are broadcasted periodically. The period for broadcasting a certain SIB depends on how quickly the UEs need to acquire the corresponding system information when entering the cell. For example, SIBs can be classified into groups named SIB1, SIB2, and so on. In general, a lower-order SIB is more time critical and is thus transmitted more frequently than a higher-order SIB. For instance, SIB1 includes information mainly related to whether a UE is allowed to camp on the cell and transmitted, for example, every 80 ms, SIB6 to SIB8 include information about neighboring cells and can be transmitted every 640 ms, for example. However, since both MIB and SIBs are mandatory to be transmitted periodically, the energy consumption at the BS side is relatively high.

In order to save energy and to fully enable utilizing high gain beam forming or other multi-antenna techniques, it is possible to separate the control/broadcast layer from the data plane for the next generation wide area networks. The system information can be carried by access information table (AIT) and system signature sequence index (SSI). Compared to conventional reference signals in cellular systems, the AIT may be transmitted with relatively long periodicity, for example, from 1.024 s up to 10.24 s. However, if all the system information is included in the AIT, the amount of system information for a single cell is already quite large. As a result, size of the AIT for multiple cells will be very large. In addition, there will be a large energy waste when the load in the cell is low.

Alternatively, the AIT can carry only the necessarily required system information, and the remaining less important system information can be transmitted in a UE-specific way. Although the AIT size is reduced, the UEs have to be connected to the cell in order to request the additional system information via UE-specific signaling. This is not convenient especially for those idle UEs. For example, when an idle UE camping on a first cell wants to obtain system information about a second cell for cell re-selection, the UE needs to access the second cell to establish a connection such as a Radio Resource Control (RRC) connection. Then the UE is able to request the optional system information to determine whether the second cell is available for re-selection. In this procedure, the idle UE has to become connected. If the target cell is barred, the idle UE will get no information about this cell. Furthermore, the idle UE usually has to perform random access and connection establishment procedure for many times, thereby consuming lots of unnecessary time and energy.

Moreover, in conventional solutions, when there are many requests from multiple UEs in the coverage area of the cell, transmission of the optional system information is not efficient. The same optional system information will be sent to different UEs via dedicated data channels, which causes significant wasting of resources. Furthermore, more overhead is needed to transmit requests from different UEs via dedicated signaling channel.

Figure 2:
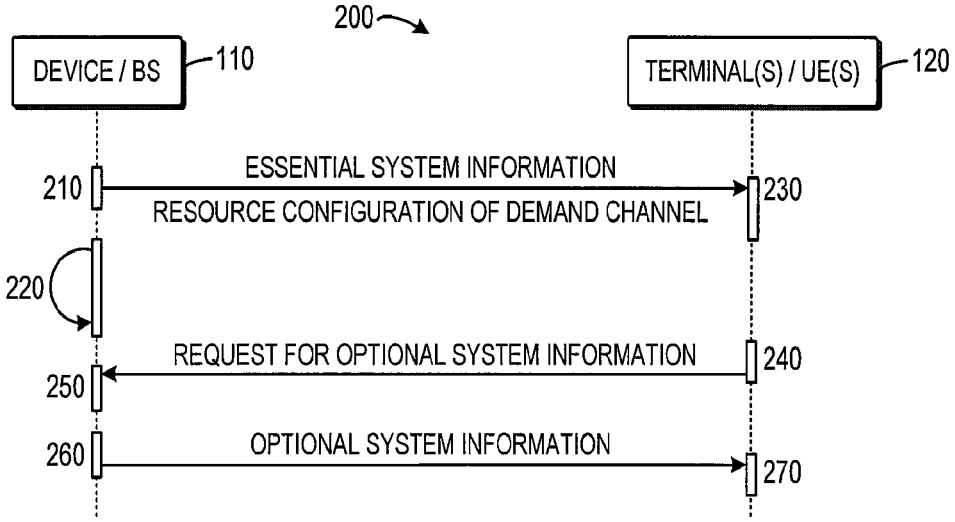
FIG. 2 is a flowchart illustrating the on-demand broadcasting of system information in accordance with embodiments of the present disclosure.

In order to solve the above and other potential problems, embodiments of the present disclosure provides on-demand broadcasting of the system information, the mechanism of which is illustrated in a high-level flowchart as shown in FIG. 2. In general, the system information is classified into two groups, namely, the essential system information and optional system information, The BS 110 periodically broadcasts (210) the essential system information which is absolutely need for access to the cell and which is usually of limited size of payload. The BS 110 also broadcasts (210) resource configuration of a demand channel by which the UEs 120 may request the optional system information. The broadcasted information can be received (230) by the UEs 120. Then the BS 110 monitors (220) the demand channel for a request(s) for the optional system information.

Optional system information is not necessarily needed for the UEs to access the cell. Therefore, transmission of the optional system information is triggered by the request from UEs. Particularly, a UE 120 may request the optional system information by sending (240) a request to the BS 110. The request is transmitted on the demand channel according to the received resource configuration. Upon receipt (250) the request, the BS 110 broadcasts (260) the optional system information in a potential resource zone that is known to the UEs 120, so that the UEs 120 can receive (270) the broadcasted optional system information.

It can be seen that in accordance with embodiments of the present disclosure, the optional system information is broadcasted as well, rather than being transmitted in UE-specific fashion. The on-demand broadcasting relieves the UEs 120 especially those idle UEs from having to perform connection establishment procedures. Moreover, overhead at BS side can be significantly reduced. Some example embodiments will now be described in detail.

Figure 3:
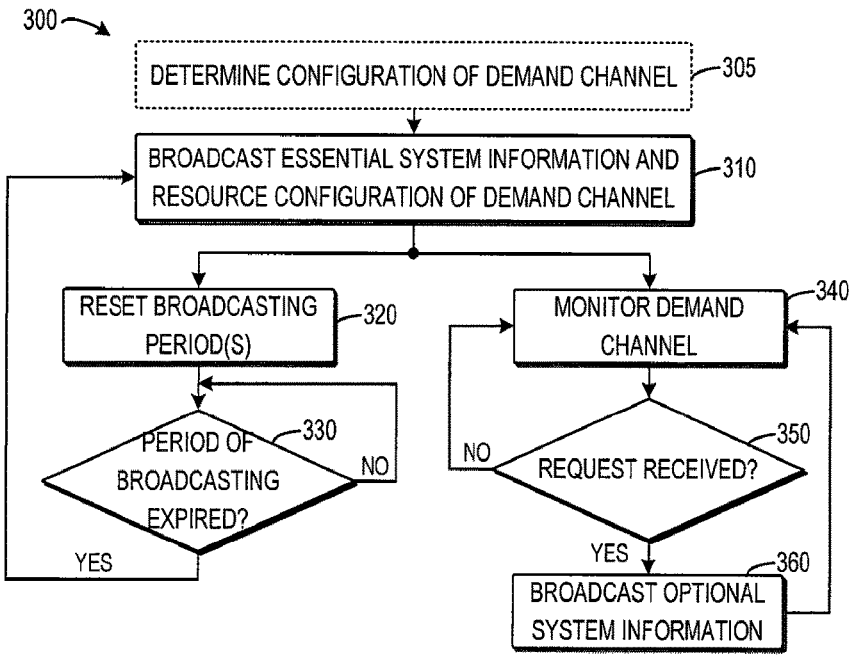
FIG. 3 is a flowchart of method implemented by a device for providing system information in accordance with embodiments of the present disclosure.

FIG. 3 shows a flowchart of a method 300 for providing system information in accordance with embodiments of the present disclosure. The method 300 can be implemented by the device/BS 110 as shown in FIG. 1, for example. In step 310, where the BS 110 broadcasts essential system information and resource configuration of the demand channel.

In accordance with embodiments of the present disclosure, the system information is categorized into essential and optional system information, as briefed above. Categorization of the essential and optional system information can be done, for example, according to property and/or objective of the system information.

Generally speaking, the essential system information includes the information that is necessarily needed for a UE 120 to access the cell 112 of the BS 110. By way of example, in some embodiments, the essential system information may include one or more of the following: downlink cell bandwidth, physical channel configuration such as duration and resource, system frame number, the number of transmit antenna ports, information about the operator/operators of the cell, information about the allocation of subframes to uplink/downlink and configuration of the special subframe for Time Division Duplex (TDD), information about the time-domain scheduling of the remaining system information, information about the uplink cell bandwidth, random-access parameters, parameters related to uplink power control, and the like. That is, in such embodiments, the essential system information broadcasted in step 310 may include at least a part of MIB, SIB1 and SIB2 in LTE systems.

Different from the essential system information, the optional system information includes relatively less important information. The UEs 120 are able to at least partially access the cell 112 of the BS 110 even in absence of the optional system information. That is why optional system information can be provided on demand. Examples of the optional system information include, but are not limited to, cell-specific information such as information about neighboring cells on the same carrier, neighboring cells on different carriers, and neighboring non-LTE cells, such as WCDMA/HSPA, GSM, and CDMA2000 cells.

It is to be understood that classification of the system information can be varied depending on the environments, communication standards, protocols, requirements, and/or other relevant factors. That is, the classification of the essential system information and the optional system information set forth herein is given as one example and should not be regarded as suggesting a limitation on the scope of the present disclosure. Those skilled in the art would appreciate that there are many different ways of classifying the system information based on the real need.

In step 310, the BS 110 broadcasts only the essential system information without optional system information. In addition, in this step, resource configuration of the demand channel is broadcasted. As used herein, the term "demand channel" refers to a channel on which the UEs 120 can send signaling as the request for transmission of the optional system information. It would be appreciated that since the demand channel is reserved for UEs 120 to send the request, the BS 110 cannot schedule both downlink and uplink data transmission on that channel. In order to avoid additional overhead, in some embodiments, the demand channel can be designed as a common channel. That is, different UEs 120 share the same demand channel to request the optional system information. In this way, the request can be transmitted with quite low overhead.

The resource configuration broadcasted in step 310 at least specifies physical resource blocks of the demand channel. That is, the resource configuration indicates a resource zone which can be used by UEs 120 to send the request for optional system information. For example, in some embodiments, the resource configuration may include the time and/or frequency offset positions with respect to a certain reference signal such as SSI. In addition, or alternatively, the resource configuration may indicate a period of the demand channel, for example, in terms of micro-subframes.

In some embodiments, the resource configuration of the demand channel is determined by the BS 110 in step 305. For example, in those embodiments where analogue beamforming is implemented for receiving signaling, the BS 110 may configure the demand channel based on the beamforming, so that resource configuration of the demand channel is beam-specific. That is, different beams are associated with different configurations. Alternatively, or in addition, the BS 110 may configure the demand channel according to the grouping of the UEs 120, so that different groups of UEs 120 have different configurations. It is to be understood that step 305 is optional. For example, in some embodiments, the resource configuration can be determined by another device or a human user and then input into the BS 110.

In some embodiments, in step 310, the resource configuration of the demand channel is included in the essential information and thus broadcasted as a part of the essential system information. Alternatively, in other embodiments, it is possible to broadcast the essential system information and the resource configuration.

In some embodiments, resource configuration of the demand channel and/or at least a part of the essential system information may be included in the AIT. As described above, an AIT is used to carry some or all access information, including initial access related parameters and relevant system information for one or multiple areas. The SSIs are broadcasted by the BS 110 and provide time synchronization as well as mapping to a table entry in the AIT. The UEs 120 may obtain access information based on the SSIs. The following Table I shows a part of an example AIT. In this example, the AIT includes the essential system information of multiple cells denoted by the respective unique SSIs, and each cell will also broadcast SSIs periodically.

TABLE I

| Global Time<br>Public Land Mobile Network (PLMN) | |
|---|---|
| SSI 1 | Essential system information for SSI 1 |
| SSI 2 | Essential system information for SSI 2 |
| . . . | . . . |

Figure 4:
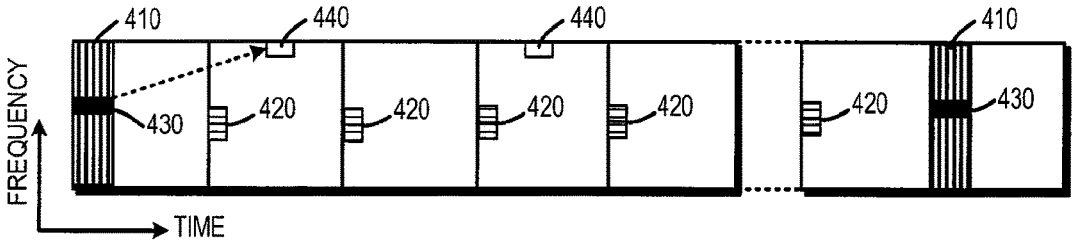
FIG. 4 is a schematic diagram illustrating the essential system information and configuration of the demand channel in accordance with embodiments of the present disclosure.

FIG. 4 shows a schematic diagram of transmission of the essential system information and resource configuration of the demand channel in AITs in accordance with example embodiments of the present disclosure. In FIG. 4, the vertical and horizontal axes represent frequency and time, respectively. AITs 410 and SSIs 420 are both periodically broadcasted. The AITs 410 are typically broadcasted with a relatively long periodicity, for example, from 1.024 s up to 10.24 s. The SSIs 420 are transmitted more frequently, for example, every 100 ms. In this example, the AITs 410 contain essential system information 430 which in turn includes the resource configuration of the demand channel. The resource configuration specifies periodical resource zones 440 on the demand channel, as indicated by the dashed line, by which the UEs 120 can send the request for optional system information.

It is to be understood that the essential system information and/or resource configuration of the demand channel do not necessarily have to be broadcasted in AITs. This is merely an example implementation without suggesting any limitations as to the scope of the present disclosure. In other embodiments, the essential system information and/or resource configuration of the demand channel may be broadcasted using any other suitable mechanisms.

It can be seen from the above description that the essential system information and the resource configuration of the demand channel are broadcasted by the BS 110 periodically. Still in reference to FIG. 3, after broadcasting the essential system information and the resource configuration in step 310, the method proceeds to step 320 where the BS 110 resets a broadcasting period(s). For example, in some embodiments, the BS 110 may use a timer in doing so. Then, in step 330, the BS 110 checks whether the period is expired. If so (branch "YES"), the method 300 returns to step 310 to broadcast the essential system information and the resource configuration of the demand channel in a next round. Otherwise, the BS 110 continues to wait for expiration of the broadcasting period in step 330.

In some embodiments such as the one discussed with reference to FIG. 4, all the essential system information is broadcasted with the same periodicity. In such embodiments, if content of the essential information system is changed for a first cell which is not broadcasting the AIT, the first cell needs to inform a second cell which is broadcasting the AIT about the update of the essential information system. At this point, the second cell has two options. The second cell can occupy a different and new item in the AIT, which is associated with a new SSI different from the original one. Then the second cell sends the new SSI back to the first cell for broadcasting. As an alternative, the second cell can update the content corresponding to that SSI of the first cell. It would be appreciated that if the AIT is updated dynamically, the above procedures will be frequently performed multiple times, which will degrade the system performance.

In order to deal with the above situation, in some embodiments, different broadcasting periods can be used in step 320 for different kinds of essential system information. More particularly, the essential information may be further classified into different groups according the property thereof and broadcasted with different periods. For example, in some embodiments, the essential system information is classified into semi-static essential system information and dynamic essential system information. The dynamic essential system information is expected to be frequently updated. Specifically, the resource configuration of the demand channel, which may change over time, can be classified as dynamic system information. The stable or slowly changed essential system information is classified as semi-static essential system information.

In general, the dynamic essential system information may be broadcasted more frequently than the semi-static essential system information. In other words, the broadcasting period for dynamic essential system information is shorter than that for semi-static essential system information. For example, in some embodiments, the semi-static essential system information can still be broadcasted in AITs, while the dynamic essential system information is separately broadcasted with a shorter periodicity. For example, the dynamic essential system may be broadcasted in a similar way to SIBs in LTE systems. However, it would be appreciated that the amount of information to be transmitted is much smaller. This will relieve the cell from frequently updating the AIT.

In some embodiments, the period for broadcasting the dynamic essential system information may be adapted. For example, if the traffic load in the cell falls below a threshold, the period for broadcasting dynamic essential system information may be increased. On the other hand, if the traffic load exceeds the threshold, that period can be shortened.

Figure 5:
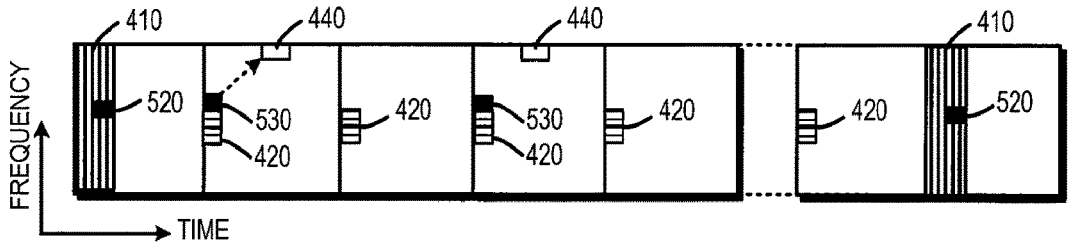
FIG. 5 is a schematic diagram illustrating separate transmission of the semi-static and dynamic essential system information in accordance with embodiments of the present disclosure.

FIG. 5 shows a schematic diagram of transmission of the semi-static and dynamic essential system information with different periods. As shown, the semi-static essential system information 520 is included in the AIT 410 and broadcasted with relatively long periodicity. The dynamic essential system information 530 is broadcasted more frequently. In this example, the dynamic essential system information 530 includes the resource configuration of the demand channel which specifies the periodical resource zones 440, as indicated by the dashed line.

It is to be understood that the dynamic essential system information 530 may include additional and/or alternative information. For example, in one embodiment, the dynamic essential system information 530 may further include configuration of a resource zone for broadcasting the optional system information, which will be discussed in the following paragraphs.

Returning to FIG. 3, in step 340, the BS 110 monitors the demand channel for a request for the optional system information. The request is sent by a UE(s) 120 on the demand channel according to the resource configuration which is broadcasted in step 310. In some embodiments, the request for optional system information may be explicit signaling. Alternatively, the request may be implicitly included in a sequence. In such embodiments, in step 340, if the BS 110 detects such a sequence in the specified resource zone on the demand channel, it can be determined that a UE(s) is requesting the optional system information.

If it is determined in step 350 that no request is received on the demand channel, the BS 110 continues monitoring the demand channel in step 340. On the other hand, if the request is received, the method 300 proceeds to step 360 where the requested optional system information is broadcasted. In some embodiments, the received request is for all the optional system information. Alternatively, the request can be only directed to a part of the optional system information. That is, the request may indicate a subset of the optional system information that the UE wants to obtain. In step 360, the BS 110 will broadcast the requested part of optional system information. Example embodiments of the request will be further explained in the following paragraphs.

Similar to the essential system information, in step 360, the requested system information is broadcasted, rather than being transmitted in a UE-specific way. This would be beneficial since those idle UEs do not have to connect to the cell to obtain the optional system information. Furthermore, in the case that multiple UEs 120 are requesting optional system information, the BS 110 does not need to transmit the same optional system information multiple times, thereby avoiding wasting of resources.

Figure 6A:
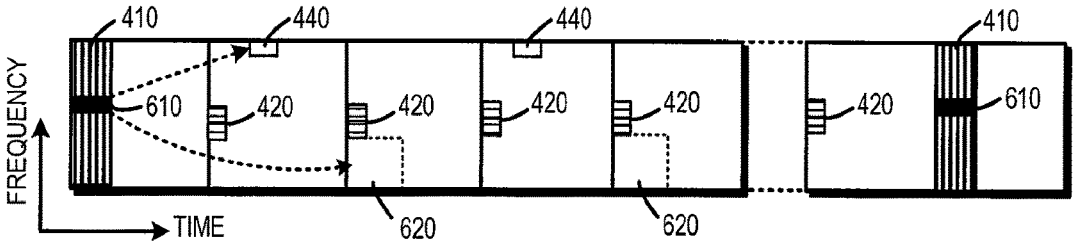
FIGS. 6A and 6B are schematic diagrams illustrating configuration of resource zones for broadcasting optional system information in accordance with embodiments of the present disclosure.
Figure 6B:
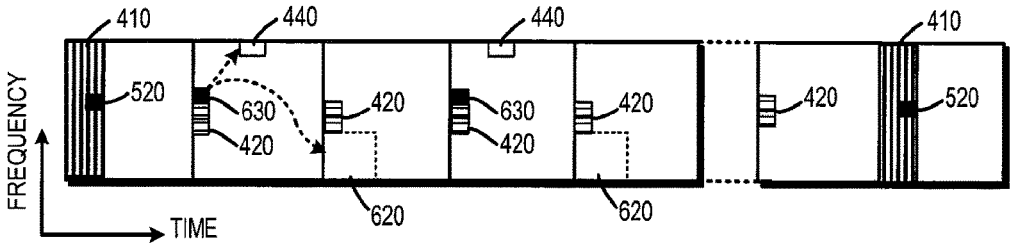

In step 360, the BS 110 transmits the requested optional system information in a predefined resource zone that is known to the UEs 120. In some embodiments, configuration of such resource zone is also broadcasted by the BS 110, for example, along with the essential system information and/or the resource configuration of the demand channel in step 310. For example, in one embodiment, configuration of the resource zone for broadcasting optional system information may be included in the essential system information. FIGS. 6A and 6B show schematic diagrams of two example embodiments.

In the example shown in FIG. 6A, the essential system information 610 specifies not only the periodical resource zones 440 of the demand channel, but also configuration of the periodical resource zones 620 by which the BS 110 broadcasts the optional system information, as indicated by the dashed lines. In this way, the UEs 120 may determine the resource zones 620 from the essential system information that is broadcasted in step 310. In this way, when the BS 110 broadcasts the optional system information in a resource zone(s) 620 in response to the request from a UE(s) 120, the UE(s) 120 is able to correctly read the optional system information.

In another embodiment as shown in FIG. 6B, the semi-static essential system information 520 and dynamic essential system information 630 are separately broadcasted with different periods, as described above. In this example, configuration of the resource zones 620 is included in the dynamic essential system information 630. That is, as indicated by the dash line, it is the dynamic essential system information 630 that specifies both the resource zones 440 and 620.

It is to be understood that configuration of the resource zone 620 does not necessarily have to be broadcasted in the essential system information. In alternative embodiments, it is possible for the BS 110 to broadcast the configuration of the resource zone 620 separately from the essential system information and/or the resource configuration of the demand channel.

In yet other embodiments, instead of broadcasting configuration of the resource zones 620, the periodical resource zones 620 can be defined in advance (for example, every 40 subframes) in a way that is known to both the BS 110 and UEs 120. In such embodiments, in step 360, in addition to the requested optional system information, the BS 110 may further broadcast an indicator in the predefined resource zone 620 to indicate existence of the requested optional system information. For example, in one embodiment, a Radio Network Temporary Identity (RNTI) or Cell Radio Network Temporary Identifier (C-RNTI) may serve as the indicator which indicates that the optional system information is available.

If the UE 120 fails to detect such an indicator in a resource zone 620, then the UE 120 can determine that no optional system information is included in this resource zone 620. If an indicator is transmitted in a resource zone 620, it means that there is available optional system information. In this way, the UE 120 can correctly read the requested optional system information from the predefined resource zone 620 based on the indicator.

Figure 7:
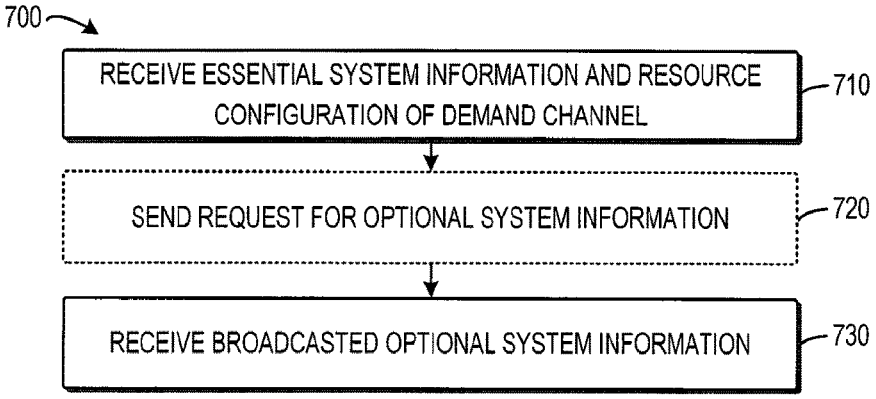
FIG. 7 is a flowchart of a method implemented by a terminal for receiving system information in accordance with embodiments of the present disclosure.

Reference is now made to FIG. 7 which shows a flowchart of a method 700 for receiving system information in accordance with embodiments of the present disclosure. The method 700 can be implemented by a terminal/UE 120 as shown in FIG. 1. For ease of illustration, example embodiments of the method 700 will be described with reference to the UE 120-1 as shown in FIG. 1.

The method 700 is entered in step 710, where the UE 120-1 receives essential system information and resource configuration of the demand channel. The received information is periodically broadcasted by the BS 110. As described above, in some embodiments, the UE 120-1 may receive the essential system information and resource configuration of the demand channel from the broadcasted AIT. In addition, or alternatively, the UE 120-1 may receive different kinds of essential system information according to different periods. For example, the dynamic essential system information may be received more frequently than the semi-static essential system information.

In some embodiments, the resource configuration of the demand channel is included in the essential system information. The demand channel may be a common channel and its resource configuration may indicate, for example, a period of the demand channel, a time offset with respect to a reference signal, and/or a frequency offset with respect to the reference signal. Other examples and features of the essential system information and the resource configuration have been described above and will not be repeated herein.

In some embodiments, the method 700 proceeds to step 720, where the UE 120-1 sends a request for the optional system information or a part thereof. In general, the request may be sent when the UE 120-1 needs the optional system information. The request is transmitted on the demand channel according to the resource configuration received in step 710. For instance, in the embodiments discussed herein with reference to FIGS. 4, 5, and 6A-6B, a request for the optional system information can be sent in a resource zone 440 which is specified by the broadcasted resource configuration.

In some embodiments, the request sent in step 720 may be explicit signaling. Alternatively, the request may be implicitly included in a sequence. That is, all the UEs 120 in the cell 112 may send a common sequence when the optional system information is needed. Upon detection of the sequence, the BS 100 knows that the optional system information is now requested. In such embodiments, since all the UEs 120 will send the same sequence, the BS 110 can detect the request in a quite effective and efficient way even if there are multiple UEs 120 that are sending requests at the substantially same time.

In some embodiments, the request sent in step 720 is for the complete optional system information. In other embodiments, the optional system information can be divided into multiple parts, and the request may indicate which kind or part of the optional system information is needed. Assuming that the optional system information is divided into three parts, the UE 120-1 determines which part is needed and send the request with the sequence corresponding to the needed part. For example, if the request includes an indication '0,' it means that the UE 120-1 is requesting all parts of the optional system information. Likewise, indications like '1', '2' and '3' may indicate to the BS 110 that only the first, second and third part of the optional system information is needed, respectively. As another example, the request may have multiple bits and different patterns of these bits are corresponding to different parts of the optional system information. Other implementations are possible as well.

In step 730, the UE 120-1 receives the requested optional system information or a part thereof which is broadcasted by the BS 110. Specifically, rather than receiving the optional system information in a UE-specific way, the UE 120-1 obtains the broadcasted optional system information from a resource zone 620 which is accessible to multiple UEs 120. As described above, the resource zone 610 can be made known to the UEs in a variety of ways. For example, in those embodiments as described with reference to FIGS. 6A-6B, configuration of the resource zone 620 is broadcasted by the BS 110 along with the essential system information 610 or 630. In other embodiments, the resource zone 620 is predefined, and the UE 120-1 will check whether there is an indicator (such as a RNTI or C-RNTI) indicating that the requested optional system information is available in a resource zone 620.

Figure 8:
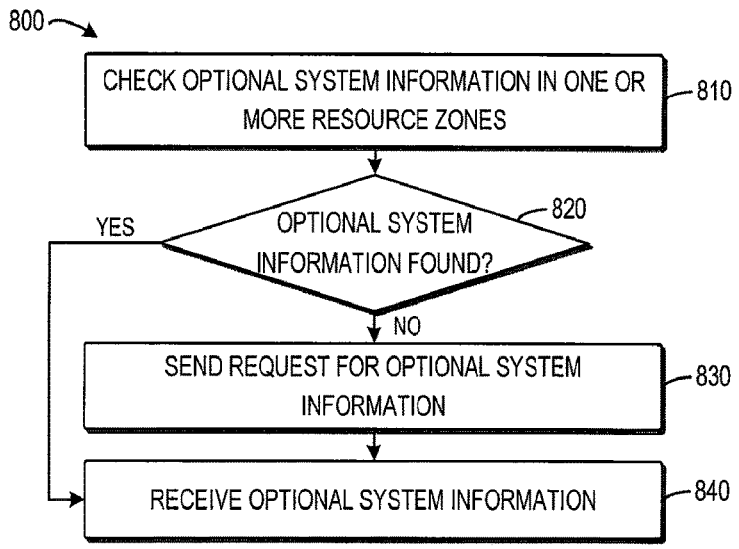
FIG. 8 is a flowchart of a method implemented by a terminal for requesting optional system information in accordance with embodiments of the present disclosure.

It is to be understood that in some embodiments, step 720 of the method 700 can be omitted in some cases and thus is shown by the dashed line in FIG. 7. Such an example embodiment will be described with reference to FIG. 8. The method 800 shown in FIG. 8 can be considered as a specific implementation of steps 720 and 730 of the method 700. For ease of discussion, it is still assumed that the method 800 is implemented by the UE 120-1 as shown in FIG. 1.

In this embodiment, when some or all optional system information is needed but the need is not urgent, the UE 120-1 does not immediately send a request. Instead, in step 810, the UE 120-1 checks the resource zone(s) 620 one or more rounds to see whether there is available optional system information which has already been broadcasted by the BS 110. Such optional system information is previously requested by other one or more UEs 120, for example, the UEs 120-2 and/or 120-3 as shown in FIG. 1.

If the UE 120-1 determines in step 820 that the needed optional system information is transmitted in a resource zone(s) 620, then the UE 120-1 can directly reuse the information in step 840, without sending the request by itself. In this way, the system overhead associated with transmission of the request can be avoided and the resource cost is thus further reduced.

Otherwise, if the optional system information is not found, the method 800 proceeds to step 830, where the UE 120-1 will send a request by itself. Then the optional system information, which is broadcasted by the BS 100 in response to the request, can be received in step 840. Specifically, it would be appreciated that sometimes the UE 120-1 can find some but not all of the optional system information it needs in a resource zone(s) 620. In this case, in step 830, the UE 120-1 may send to the BS 110 a request only for the remaining unavailable optional system information, which prevents the BS 110 from transmitting duplicated information.

Figure 9:
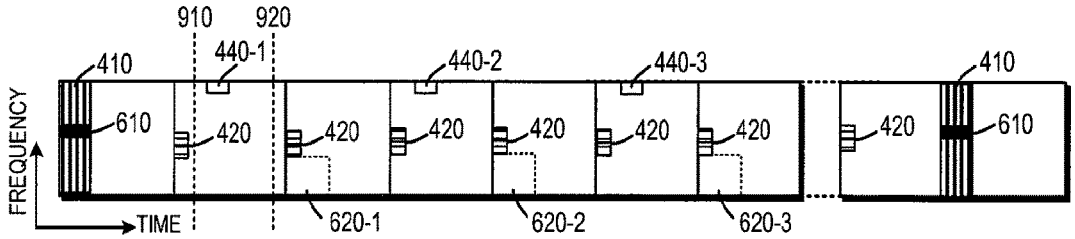
FIG. 9 is a schematic diagram illustrating request for the optional system information by multiple terminals in accordance with embodiments of the present disclosure.

FIG. 9 shows a schematic diagram of an example where the method 800 is applied. By way of example, it is supposed that UE 120-2 has already requested the optional system information at a time point 910. When the UE 120-1 needs optional system information at a subsequent time point 920, if the need is not urgent, the UE 120-1 can check one or more resource zones for the optional system information. As an example, in one embodiment, the UE 120-1 can first check the resource zone 620-1. If not all the optional system information as needed is available, the UE 120-1 continues to check a subsequent resource zone 620-2 later. If the UE 120-1 still fails to find all needed optional system information, it may send a request using the resource 440-3 on the demand channel, for example. Then the UE 120-1 may receive the requested optional system information in a subsequent resource zone such as the resource zone 620-3. It is to be understood that although the UE 120-1 checks two resource zones 620-1 and 620-2 in this example, this is merely for the purpose of illustration without suggesting any limitations as to the scope of the present disclosure. In other embodiments, the UE 120-1 can check only one resource zone or multiple resource zones in more than two rounds.

Figure 10:
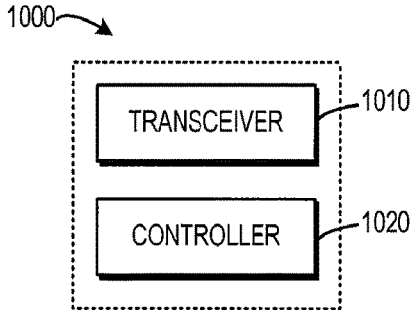
FIG. 10 is a simplified block diagram of a device in a communication system in accordance with embodiments of the present disclosure.

FIG. 10 is a simplified block diagram of a device 1000 in accordance with embodiments of the present disclosure. The device 1000 can act as the BS 110 as shown in FIG. 1. As shown, the device 1000 includes a transceiver 1010 configured to broadcast essential system information and a resource configuration of a demand channel, where the essential system information being required to access a cell of the device. The device 1000 further includes a controller 1020 configured to monitor, on the demand channel, a request for at least a part of optional system information other than the essential system information. The transceiver 1010 is further configured to broadcast the part of the optional system information in response to receiving the request.

In some embodiments, the transceiver 1010 is configured to broadcast the resource configuration of the demand channel and at least a part of the essential system information in an AIT. In some embodiments, the transceiver 1010 is configured to broadcast semi-static system information of the essential system information with a first period, and to broadcast dynamic system information of the essential system information with a second period shorter than the first period. In some embodiments, the dynamic system information includes the resource configuration of the demand channel.

In some embodiments, the transceiver 1010 is further configured to broadcast a configuration of a resource zone with the essential system information. In these embodiments, the transceiver 1010 is configured to broadcast the part of the optional system information in the resource zone. Alternatively, in some embodiments, the transceiver 1010 is configured to broadcast an indicator in a predefined resource zone to indicate existence of the part of the optional system information, and to broadcast the part of the optional system information in the predefined resource zone.

In some embodiments, the transceiver 1010 is configured to broadcast the resource configuration of the demand channel as a part of the essential system information. In some embodiments, the resource configuration of the demand channel includes at least one of the following: a period of the demand channel, a time offset with respect to a reference signal, or a frequency offset with respect to the reference signal.

In some embodiments, the controller 1020 is further configured to determine the resource configuration of the demand channel based on at least one of the following: beamforming of the device, or grouping of terminals in the cell. In some embodiments, the controller 1020 is configured to monitor a sequence as the request, the sequence being common to a plurality of terminals in the cell.

Figure 11:
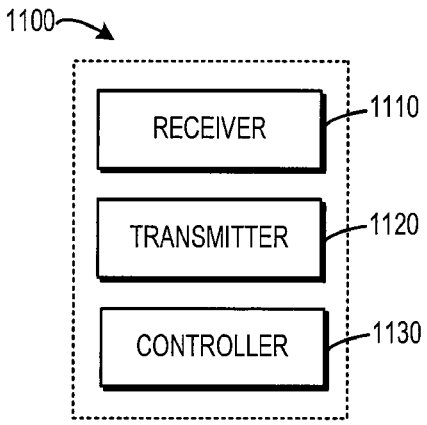
FIG. 11 is a simplified block diagram of a terminal in a communication system in accordance with embodiments of the present disclosure.

FIG. 11 shows a simplified block diagram of a terminal or UE 1100 in accordance with embodiments of the present disclosure. The terminal 1100 can act as the UE 120-1,120-2 or 120-3 as shown in FIG. 1. As shown, the terminal 1100 includes a receiver 1100 configured to receive essential system information and a resource configuration of a demand channel that are broadcasted by a device. The receiver 1100 is further configured to receive at least a part of optional system information other than the essential system information, where the part of the optional system information is broadcasted by the device in response to a request that is sent on the demand channel according to the resource configuration.

In some embodiments, the terminal 1100 further includes a transmitter 1120 configured to the request for the part of the optional system information on the demand channel according to the resource configuration. In some embodiments, the terminal 1100 further includes a controller 1130 configured to check, in a resource zone, the part of the optional system information that is requested by a further terminal. In these embodiments, the transmitter 1120 is configured to send the request to the device in response to missing the part of the optional system information in the resource zone. In some embodiments, the transmitter 1120 is configured to send a sequence as the request, the sequence being common to the terminal and a further terminal in the cell.

In some embodiments, the receiver 1110 is configured to receive an AIT that is broadcasted by the device. In these embodiments, the resource configuration of the demand channel and at least a part of the essential system information are included in the received AIT.

In some embodiments, the receiver 1110 is configured to receive semi-static system information of the essential system information that is broadcasted by the device with a first period, and to receive dynamic system information of the essential system information that is broadcasted by the device with a second period shorter than the first period. In some embodiments, the dynamic system information may include the resource configuration of the demand channel.

In some embodiments, the receiver 1110 is further configured to receive a configuration of a resource zone that is broadcasted by the device with the essential system information. In these embodiments, the receiver 1110 is configured to receive the part of the optional system information in the resource zone. Alternatively, in some embodiments, the receiver 1110 is configured to, in response to receiving an indicator in a predefined resource zone, receive the part of the optional system information in the predefined resource zone, where the indicator indicates existence of the part of the optional system information in the predefined resource zone.

Figure 12:
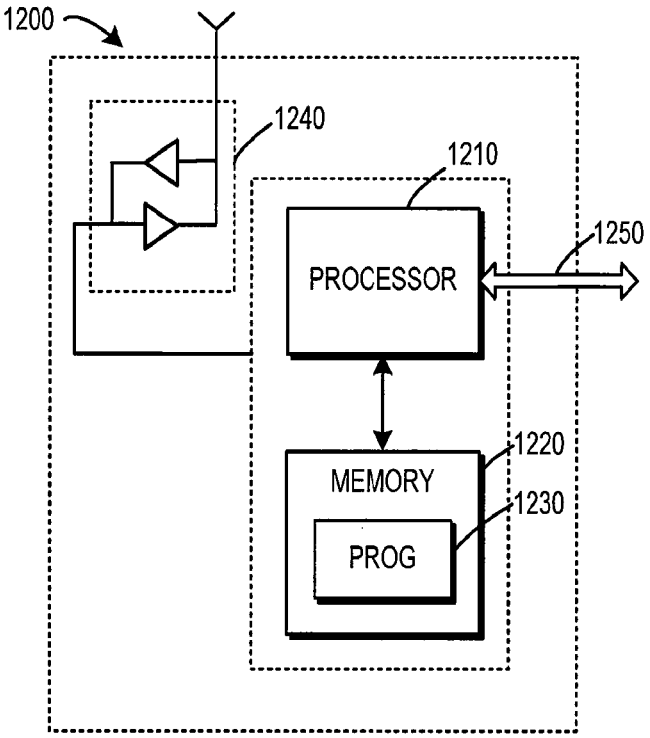
FIG. 12 is a simplified block diagram of a device that is suitable for implementing embodiments of the present disclosure.

In some embodiments, the receiver 1110 is configured to receive the resource configuration of the demand channel included in the essential system information. In some embodiments, the resource configuration of the demand channel includes at least one of the following: a period of the demand channel, a time offset with respect to a reference signal, or a frequency offset with respect to the reference signal. In some embodiments, the resource configuration of the demand channel is determined based on at least one of the following: beamforming of the device or grouping of terminals in the cell FIG. 12 is a simplified block diagram of a device 1200 that is suitable for implementing embodiments of the present disclosure. For example, both the BS 110 and UEs 120 as shown in FIG. 1 can be implemented by the device 1200.

As shown, the device 1200 includes a processor 1210, a memory 1220 coupled to the processor 1210, a suitable transmitter (TX) and receiver (RX) 1240 coupled to the processor 1210, and a communication interface 1250 coupled to the processor 1210. The memory 1210 stores at least a part of a program 1230. The TX/RX 1240 is for bidirectional wireless communications. The TX/RX 1240 has at least one antenna to facilitate communication, though in practice an Access Node mentioned in this application may have several ones. The communication interface 1250 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the embodiments of the present disclosure, as discussed herein with reference to FIGS. 2 to 8. The embodiments herein may be implemented by computer software executable by the processor 1210 of the device 1200, or by hardware, or by a combination of software and hardware. A combination of the processor 1210 and memory 1210 may form processing means adapted to implement various embodiments of the present disclosure.

The memory 1210 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one memory 1210 is shown in the device 1200, there may be several physically distinct memory modules in the device 1200. The processor 1210 may be of any type suitable to the local technical environment, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented by a device at a base station of a cell of a cellular network, comprising:

broadcasting, to at least one terminal, essential system information, the essential system information comprising a resource configuration of a demand channel for requesting optional system information to be provided to the at least one terminal on a demand-basis and information identifying a predefined resource zone for receiving the optional system information in response to a request for the optional system information, wherein the essential system information is required to access a cell of the device, wherein the demand channel is a channel on which user equipments send a request for requesting at least a part of the optional system information on the demand-basis to avoid periodic transmission of the optional system information, wherein the information identifying the predefined resource zone comprises [at least one of a time resource or a frequency resource] *an identifier of one or more physical resource blocks* (*PRBs*) for receiving the optional system information, *and wherein the resource configuration of the demand channel includes at least one of the following: a period of the demand channel, a time offset with respect to a reference signal, or a frequency offset with respect to the reference signal*;

while monitoring the demand channel, receiving a request from the at least one terminal for at least a part of optional system information other than the essential system information; and in response to receiving the request from a user equipment, broadcasting an indicator in the predefined resource zone to indicate existence of the part of the optional system information and broadcasting, on the demand basis, the part of the optional system information in the predefined resource zone.

2. The method of claim 1, wherein the demand channel is a common channel shared by terminals in the cell.

3. The method of claim 1, wherein broadcasting the essential system information and the resource configuration of the demand channel comprises:

broadcasting the resource configuration of the demand channel and at least a part of the essential system information in an access information table (AIT).

4. The method of claim 1, wherein broadcasting the essential system information comprises:

broadcasting semi-static system information of the essential system information with a first period; and broadcasting dynamic system information of the essential system information with a second period shorter than the first period, the dynamic system information including the resource configuration of the demand channel.

5. The method of claim 1, further comprising:

broadcasting a configuration of a resource zone with the essential system information, wherein broadcasting the part of the optional system information comprises broadcasting the part of the optional system information in the resource zone.

6. The method of claim 1, wherein broadcasting essential system information and the resource configuration of the demand channel comprises:

broadcasting the resource configuration of the demand channel as a part of the essential system information.

[7. The method of claim 1, wherein the resource configuration of the demand channel includes at least one of the following: a period of the demand channel, a time offset with respect to a reference signal, or a frequency offset with respect to the reference signal.]

8. The method of claim 1, further comprising:

determining the resource configuration of the demand channel based on at least one of the following: beamforming of the device, or grouping of terminals in the cell.

9. The method of claim 1, wherein monitoring the request comprises:

monitoring a sequence as the request, the sequence being common to a plurality of terminals in the cell.

10. A device at a base station of a cell of a cellular network, comprising:

a transceiver configured to broadcast, to at least one terminal, essential system information, the essential system information comprising a resource configuration of a demand channel for requesting optional system information to be provided to the at least one terminal on a demand-basis and information identifying a predefined resource zone for receiving the optional system information in response to a request for the optional system information, wherein the essential system information is required to access a cell of the device, wherein the demand channel is a channel on which terminals send a request for requesting at least a part of the optional system information on the demand-basis to avoid periodic transmission of the optional system information, wherein the information identifying the predefined resource zone comprises [at least one of a time resource or a frequency resource] *an identifier of one or more physical resource blocks* (*PRBs*) for receiving the optional system information, *wherein the resource configuration of the demand channel includes at least one of the following: a period of the demand channel, a time offset with respect to a reference signal, or a frequency offset with respect to the reference signal*; and controller configured to, while monitoring demand channel, receive a request from the at least one terminal for at least a part of optional system information other than the essential system information, the transceiver being further configured to:

broadcast an indicator in the predefined resource zone to indicate existence of the part of the optimal system information; and in response to receiving the request and on the demand-basis, broadcast the part of the optional system information in the predefined resource zone.

11. The device of claim 10, wherein the demand channel is a common channel shared by terminals in the cell.

12. The device of claim 10, wherein the transceiver is configured to broadcast the resource configuration of the demand channel and at least a part of the essential system information in an access information table (AIT).

13. The device of claim 10, wherein the transceiver is configured to:

broadcast semi-static system information of the essential system information with a first period; and broadcast dynamic system information of the essential system information with a second period shorter than the first period, the dynamic system information including the resource configuration of the demand channel.

14. The device of claim 10, wherein the transceiver is further configured to broadcast a configuration of a resource zone with the essential system information, and wherein the transceiver is configured to broadcast the part of the optional system information in the resource zone.

15. The device of claim 10, wherein the transceiver is configured to broadcast the resource configuration of the demand channel as a part of the essential system information.

[16. The device of claim 10, wherein the resource configuration of the demand channel includes at least one of the following: a period of the demand channel, a time offset with respect to a reference signal, or a frequency offset with respect to the reference signal.]

17. The device of claim 10, wherein the controller is further configured to determine the resource configuration of the demand channel based on at least one of the following: beamforming of the device, or grouping of terminals in the cell.

18. The device of claim 10, wherein the controller is configured to monitor a sequence as the request, the sequence being common to a plurality of terminals in the cell.

*19. A method implemented by a terminal, comprising:*

*receiving essential system information broadcast by a device at a base station of a cell of a cellular network, the essential system information comprising a resource configuration of a demand channel for requesting optional system information to be provided to the terminal on a demand-basis and information identifying a predefined resource zone for receiving the optional system information in response to a request for the optional system information, wherein the essential system information is required to access a cell of the device, wherein the demand channel is a channel for requesting at least a part of the optional system information on the demand-basis, wherein the information identifying the predefined resource zone comprises an identifier of one or more physical resource blocks (PRBs) for receiving the optional system information, wherein the resource configuration of the demand channel includes at least one of the following: a period of the demand channel, a time offset with respect to a reference signal, or a frequency offset with respect to the reference signal;*

*sending, on the demand channel, a request for at least a part of optional system information other than the essential system information; and*

*receiving an indicator broadcast in the predefined resource zone, the indicator indicating existence of the part of the optional system information and receiving, on the demand basis, the part of the optional system information broadcast in the predefined resource zone.*

*20. The method of claim 19, wherein the demand channel is a common channel shared by the terminal and one or more other terminals in the cell.*

*21. The method of claim 19, wherein the resource configuration of the demand channel and at least a part of the essential system information is received in an access information table (AIT).*

*22. The method of claim 19, wherein receiving the essential system information comprises:*

*receiving semi-static system information of the essential system information with a first period; and*

*receiving dynamic system information of the essential system information with a second period shorter than the first period, the dynamic system information including the resource configuration of the demand channel.*

*23. The method of claim 19, further comprising:*

*receiving a configuration of a resource zone with the essential system information;*

*wherein receiving the part of the optional system information comprises receiving the part of the optional system information in the resource zone.*

*24. The method of claim 19, wherein receiving essential system information and the resource configuration of the demand channel comprises:*

*receiving the resource configuration of the demand channel as a part of the essential system information.*

*25. The method of claim 19, wherein the resource configuration of the demand channel is based on at least one of the following: beamforming of the device, or grouping of terminals in the cell.*

*26. The method of claim 19, wherein the request is associated with a sequence common to a plurality of terminals in the cell.*

*27. A terminal, comprising:*

*a receiver configured to receive essential system information broadcast by a device at a base station of a cell of a cellular network, the essential system information comprising a resource configuration of a demand channel for requesting optional system information to be provided to the terminal on a demand-basis and information identifying a predefined resource zone for receiving the optional system information in response to a request for the optional system information, wherein the essential system information is required to access a cell of the device, wherein the demand channel is a channel for requesting at least a part of the*

*optional system information on the demand-basis, wherein the information identifying the predefined resource zone comprises an identifier of one or more physical resource blocks (PRBs) for receiving the optional system information, wherein the resource configuration of the demand channel includes at least one of the following: a period of the demand channel, a time offset with respect to a reference signal, or a frequency offset with respect to the reference signal; and*

*a transmitter configured to send, on the demand channel, a request for at least a part of optional system information other than the essential system information;*

*wherein the receiver is further configured to:*

*receive an indicator broadcast in the predefined resource zone, the indicator indicating existence of the part of the optimal system information; and*

*receive, on the demand-basis, the part of the optional system information broadcast in the predefined resource zone.*

*28. The terminal of claim 27, wherein the demand channel is a common channel shared by the terminal and one or more other terminals in the cell.*

*29. The terminal of claim 27, wherein the resource configuration of the demand channel and at least a part of the essential system information is received in an access information table (AIT).*

*30. The terminal of claim 27, wherein the receiver is configured to:*

*receive semi-static system information of the essential system information with a first period; and*

*receive dynamic system information of the essential system information with a second period shorter than the first period, the dynamic system information including the resource configuration of the demand channel.*

*31. The terminal of claim 27, wherein the receiver is further configured to:*

*receive a configuration of a resource zone with the essential system information; and*

*receive the part of the optional system information in the resource zone.*

*32. The terminal of claim 27, wherein the receiver is configured to receive the resource configuration of the demand channel as a part of the essential system information.*

*33. The terminal of claim 27, wherein the resource configuration of the demand channel is based on at least one of the following: beamforming of the device, or grouping of terminals in the cell.*

*34. The terminal of claim 27, wherein the request is associated with a sequence common to a plurality of terminals in the cell.*

* * * * *